3,114,926
WINDSHIELD WIPER
Raymond A. Deibel, Cheektowaga, N.Y., assignor to Trico Products Corporation, Buffalo, N.Y.
Filed Sept. 25, 1961, Ser. No. 140,320
4 Claims. (Cl. 15—250.42)

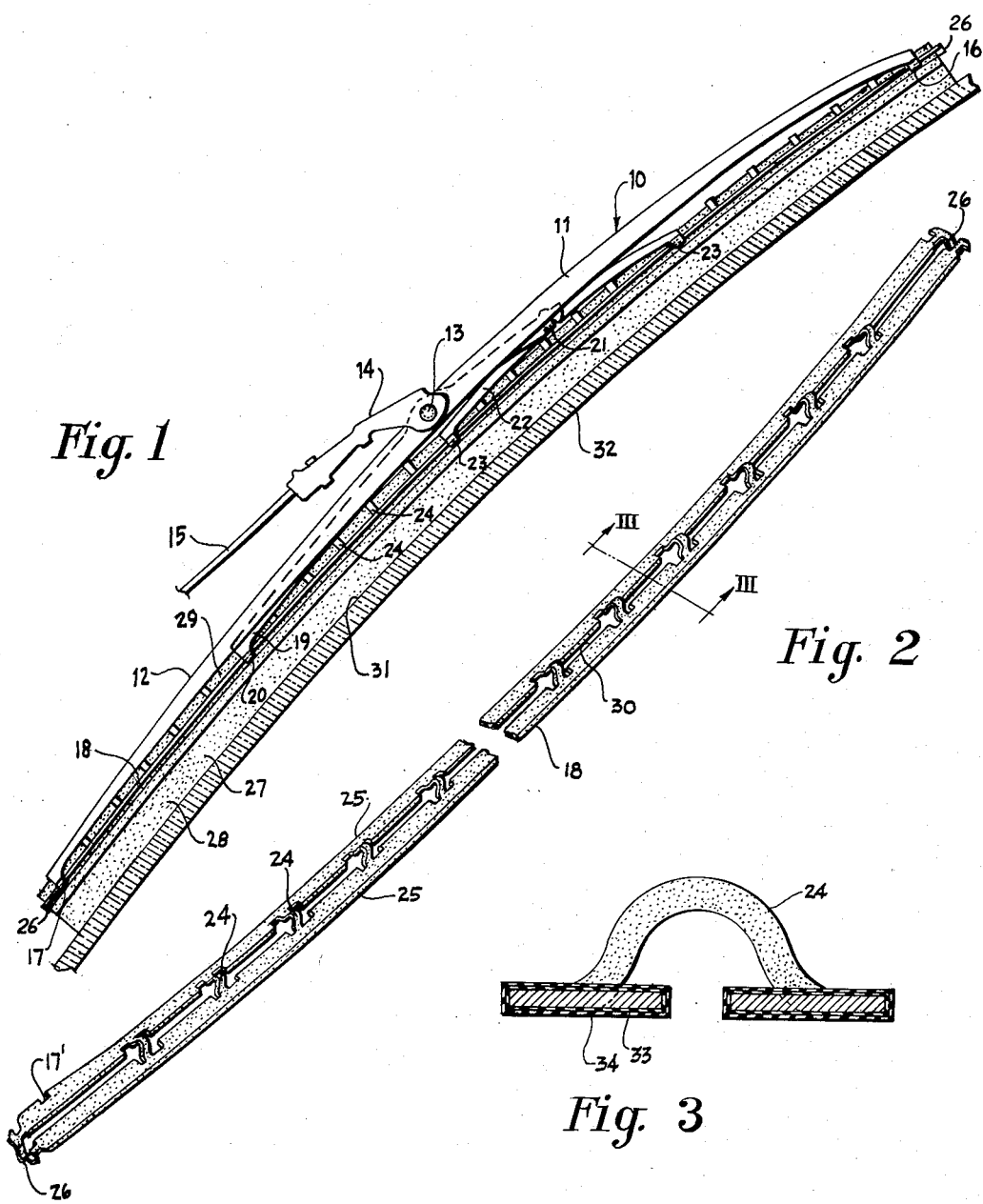

The present invention relates to an improved windshield wiper for curved windshields and more particularly to an improved backing strip therefor.

It is a primary object of the present invention to provide an improved windshield wiper capable of providing silent operation, improved surface conformance characteristics, and resistance to clogging during freezing weather when ice has a tendency to form on the wiper. Other objects and attendant advantages of the present invention will readily be perceived hereafter.

The windshield wiper of the present invention includes a superstructure movably mounting a backing strip which carries the wiping element. The backing strip consists of a flexible metallic base with a polymerized coating thereon. The polymerized coating on the backing strip insulates the latter from the claws of the superstructure and therefore, because of its resilient buffering characteristics, acts as a noise deadening agent to provide silent wiper operation. Furthermore, when the polymerized coating is wet, as it is substantially all of the time that the wipers are in operation, it acts as a lubricant upon which the claws of the superstructure slide to thereby permit the backing strip which carries the wiping element to conform more readily to the areas of various curvature of the windshield. In addition the polymerized coating has less of an affinity for the adhesion of ice thereto than an uncoated metallic backing strip and therefore tends to prevent the clogging of the wiper when it is used during freezing weather. The present invention will be more fully understood when the following portions of the specification are read in conjunction with the accompanying drawings wherein:

FIG. 1 is a side elevational view of a windshield wiper on a curved windshield;

FIG. 2 is a fragmentary perspective view of the improved backing strip of the present invention; and FIG. 3 is a cross sectional view taken along line III—III of FIG. 2.

In FIG. 1 a windshield wiper 10 is shown having levers 11 and 12 pivotally mounted on pin 13 which also mounts clip 14 to which wiper arm 15 is attached. A spring (not shown) encircles the medial portion of pin 13 and bears downwardly on levers 11 and 12. The outer ends of levers 11 and 12 are formed into claws 16 and 17, respectively, which slidably engage opposite sides of backing strip 18. A lever 19 is also pivotally mounted on pin or rivet 13 and has one end thereof formed into claws 20 which also slidably engage opposite sides of backing strip 18. The other end of lever 19 is formed into claw-like portion 21 which pivotally support pressure equalizer 22, the opposite ends of which are formed into claws 23 which slidably engage opposite sides of backing strip 18. If desired, one of all of the abovementioned claws, such as claw 17, may fit into a notch 17' in the backing strip to securely lock the backing strip to the superstructure. The backing strip has a plurality of bridgelike members 24 which join opposite side rail portions 25 thereof. The end bridge members 26 of the backing strip are formed downwardly to prevent displacement of the wiping element 27 from the backing member. The wiping element has a neck portion (not shown), located in slot 30 of the backing strip, the neck portion connecting the head portion 29 to the wiping portion 28. The wiping portion 28 terminates in a wiping lip 31 which is adapted to traverse windshield 32. A configuration of the backing strip forms no part of the present invention and may be made in accordance with the principles set forth in Patent No. 2,766,474.

In accordance with the present invention a polymeric coating is applied to the metallic backing strip 18 for the purposes of deadening the noise between the backing strip and the claws, increasing the conforming characteristics of the backing strip, and preventing the adhesion of ice to said backing strip. In order to apply the polymeric coating the metallic backing strip is first cleaned in a suitable bath which may consist of alkali solutions or solvents used for metal cleaning purposes. The metal surface is thereafter etched or roughened by dipping in a commercial sulphuric acid solution. A relatively thin catalyzed epoxy coating, such as Rowe Products No. PN 108-1 known under the trade-mark "Epoloid" which is used with a suitable activator, is then sprayed on strip 18 to provide a primer coat 33. After the primer coat is applied, it is cured by baking at a temperature of 250° F. for approximately 20 minutes. Thereafter a catalyzed polyurethane outer coating 34, such as Pratt & Lambert No. GPU-4A with catalyst No. 6329 in a ratio of 3:1 and thinned with Pratt & Lambert thinner No. 1580, is also applied by spraying and this outer coating is thereafter cured at a temperature of 250° F. for a period of one hour. It will be understood that other curing times and temperatures which are suitable to give the desired adhesion between the various materials may be utilized. It will be appreciated, of course, that the coatings are schematically represented in FIG. 3 for purposes of illustration and that the thicknesses thereof do not necessarily reflect the actual thickness of such coatings which are used on the actual article.

It has also been found that other coatings are satisfactory for achieving the above-noted objectives. More specifically, a primer of a suitable vinyl base may be applied after the surface of the metal has been cleaned and etched in the above-noted manner. The primer may be Pratt & Lambert No. 101-114 which is thinned to a suitable consistency and sprayed on. Thereafter permitting the above primer coating to dry at ambient temperature for 5 minutes will provide sufficient curing. A top coat of a suitable vinyl material such as Pratt & Lambert No. 91-1614 is thereafter applied by spraying and is air dried for 5 minutes and then baked at 350° F. for 10 minutes. This coating has also been found satisfactory.

The above treatment of a metallic backing strip results in the providing of an outer polymeric coating having a high degree of tenacity against separation from the parent backing strip. Because of the resiliency of the coating, cushioning of the backing strip is effected so that a wiper employing a backing strip of the present invention will operate noiselessly in that metal-to-metal contact between the superstructure and the backing strip is obviated. Furthermore, as noted above, when the coating is wet, as it is during normal wiper operation, it acts as a lubricant between the backing strip and the superstructure and thereby tends to obviate any tendency for the superstructure claws to bind on the backing strip and thus enhances good surface conformance of the backing strip. Furthermore, as noted above, ice will form less readily on the backing strip which is treated in the above manner and therefore the tendency for wipers employing such a backing strip to clog during freezing weather is clearly minimized.

While a preferred embodiment of the present invention is disclosed, it will be readily understood that the present invention is not limited thereto, but may be otherwise embodied within the scope of the following claims.

What is claimed is:

1. A windshield wiper comprising a metallic superstructure, a metallic backing strip, spaced means on said superstructure for slidably engaging opposite sides of opposite edges of said backing strip, a wiping element mounted on said backing strip, said backing strip including a polymeric coating on opposite sides thereof for providing resilient buffering between said spaced means on said superstructure and said opposite sides of said backing strip by preventing metal-to-metal contact therebetween during movement of said wiper.

2. A windshield wiper comprising a metallic superstructure, a metallic backing strip, a plurality of spaced means on said superstructure for slidably engaging opposite sides of opposite edges of said backing strip, a wiping element mounted on said backing strip, and a polymeric coating between all portions of said spaced means and said backing strip for minimizing the clogging effect of ice between said backing strip and said spaced means.

3. A windshield wiper comprising a metallic superstructure, a metallic backing strip having opposite edges and opposite surfaces adjacent said opposite edges, spaced means on said superstructure for slidably engaging said opposite surfaces of said backing strip, a wiping element mounted on said backing strip, said backing strip including a coating of polymeric material on said opposite surfaces for providing resilient buffering between said spaced means on said superstructure and said opposite surfaces of said backing strip during movement of said wiper to thereby deaden noise, said coating also providing a lubricated surface when wet to enhance relative movement between said spaced means and said backing strip to thereby enhance the conforming of said wiping element to a windshield during movement of said wiper, said coating also having less of an affinity for ice than an uncoated backing strip to thereby tend to prevent the existence of ice between said backing strip and said spaced means which would impede relative movement therebetween.

4. A windshield wiper comprising a metallic superstructure, a metallic backing strip having opposite edges and opposite surfaces adjacent said opposite edges, a plurality of spaced means on said superstructure each having opposed surfaces for slidably engaging said opposite surfaces of said backing strip, a wiping element mounted on said backing strip, a coating of polymeric material between all portions of opposed surfaces of certain of said spaced means and said opposite sides of said backing strip for providing resilient buffering between said spaced means on said superstructure and said opposite surfaces of said backing strip during movement of said wiper to thereby deaden noise, said coating also providing a lubricated surface when wet to enhance relative movement between said spaced means and said backing strip to thereby enhance the conforming of said wiping element to a windshield during movement of said wiper, said coating also having a lower affinity for ice than metal to thereby tend to prevent the existence of ice between said backing strip and said spaced means which would impede relative movement therebetween.

References Cited in the file of this patent
UNITED STATES PATENTS

| | | |
|---|---|---|
| 2,746,077 | Higgins | May 22, 1956 |
| 2,864,722 | Millard et al. | Dec. 16, 1958 |
| 3,030,249 | Jones et al. | Apr. 17, 1962 |
| 3,041,654 | Anderson | July 3, 1962 |